UNITED STATES PATENT OFFICE.

HANS T. CLARKE, OF ROCHESTER, NEW YORK, ASSIGNOR TO EASTMAN KODAK COMPANY, OF ROCHESTER, NEW YORK, A CORPORATION OF NEW YORK.

CELLULOSE-ESTER COMPOSITION.

1,398,939.      Specification of Letters Patent.      Patented Nov. 29, 1921.

No Drawing.      Application filed December 27, 1920. Serial No. 433,398.

*To all whom it may concern:*

Be it known that I, HANS T. CLARKE, a subject of the King of Great Britain, residing at Rochester, in the county of Monroe and State of New York, have invented certain new and useful Improvements in Cellulose-Ester Compositions, of which the following is a full, clear, and exact specification.

This invention relates to new compositions of matter in which cellulose esters are combined or mixed with other substances, so that the resulting products can be advantageously used in the plastic and analogous arts, such, for instance, as sheet or film manufacture.

One object of my invention is to provide a composition which may be made into permanently transparent, strong and flexible sheets or films of desired thinness, that have all the necessary qualities of a support for photographically sensitized layers, for instance. Another object of my invention is to provide a composition in which the ingredients which remain in the finished films are of relatively high boiling point and correspondingly low volatility.

I have discovered that a composition of matter having the desired qualities can be obtained by mixing or compounding a cellulose ester like cellulose nitrate or cellulose acetate with phenolic esters of phthalic acid. This compounding is best performed by mixing the cellulose esters and the phthalates by means of a solvent common to both. One example of a suitable ingredient is diphenyl ortho phthalate which boils at 280° C., under 15 mm., pressure and, therefore, boils well above 360° C., under normal conditions.

In carrying out one illustration of my invention, I thoroughly incorporate in 300 to 600 parts of a mixture of acetone and methyl alcohol (say equal parts of each such solvent) 100 parts of nitrocellulose, 5 to 100 parts of fusel oil or normal butyl or isobutyl alcohol and from 1 to 45 parts (say 10 parts) of diphenyl ortho phthalate. In place of the mixture of acetone and methyl alcohol either of these substances may be used alone or any of the well known equivalent volatile common solvents of nitrocellulose and the phthalate and higher alcohols. The ingredients are of the commercial grades and of sufficient purity to yield films of the desired transparency and freedom from color. The ingredients are thoroughly mixed and may be filtered if desired. The higher alcohols serve to enhance the flexibility of the resulting film and may be used alone or mixed. Their boiling points are above 100° C.

In carrying out another illustration of my invention, I incorporate in 400 to 600 parts of acetone, 100 parts of cellulose acetate and 1 to 55 parts (say 10 parts) of phenyl phthalate.

These solutions can be made of the right thickness and viscosity, by varying the amount of volatile solvent, so as to flow properly during sheet or film manufacture under well known conditions. The resulting film, after the volatile solvents have evaporated, contains essentially the cellulose ester and the phthalate, together with some of the higher alcohols in the case of cellulose nitrate film. The phthalate in such film is substantially non-volatile.

Having thus described my invention, what I claim as new and desire to secure by Letters Patent is:

1. A composition of matter comprising a cellulose ester and a phenolic ester of phthalic acid.

2. A composition of matter comprising a cellulose ester, phenyl phthalate and a solvent common to both.

3. A composition of matter comprising cellulose nitrate and a phenolic ester of phthalic acid.

4. A composition of matter comprising cellulose nitrate, a phenolic ester of phthalic acid and a substance which enhances the flexibility thereof.

5. A composition of matter comprising cellulose nitrate, diphenyl ortho phthalic acid, and a monohydroxy aliphatic alcohol having from 4 to 5 carbon atoms, the boiling point of which is above 100° C.

6. A composition of matter comprising 100 parts of cellulose nitrate, 300 to 600 parts of a volatile solvent, 5 to 100 parts of fusel oil and 1 to 45 parts of phenyl phthalate.

7. As an article of manufacture, a sheet of deposited or flowed cellulose ester containing a phenolic ester of phthalic acid.

8. As an article of manufacture, a sheet of deposited or flowed cellulose nitrate containing a phenolic ester of phthalic acid.

9. As an article of manufacture, a sheet of deposited or flowed cellulose nitrate containing phenyl phthalate and a monohydroxy aliphatic alcohol having from 4 to 5 carbon atoms and boiling above 100° C.

Signed at Rochester, New York, this 21st day of December, 1920.

HANS T. CLARKE.